Sept. 11, 1923.
B. E. PAGE
CORN POPPER
Filed April 14, 1922
1,467,448
2 Sheets-Sheet 1
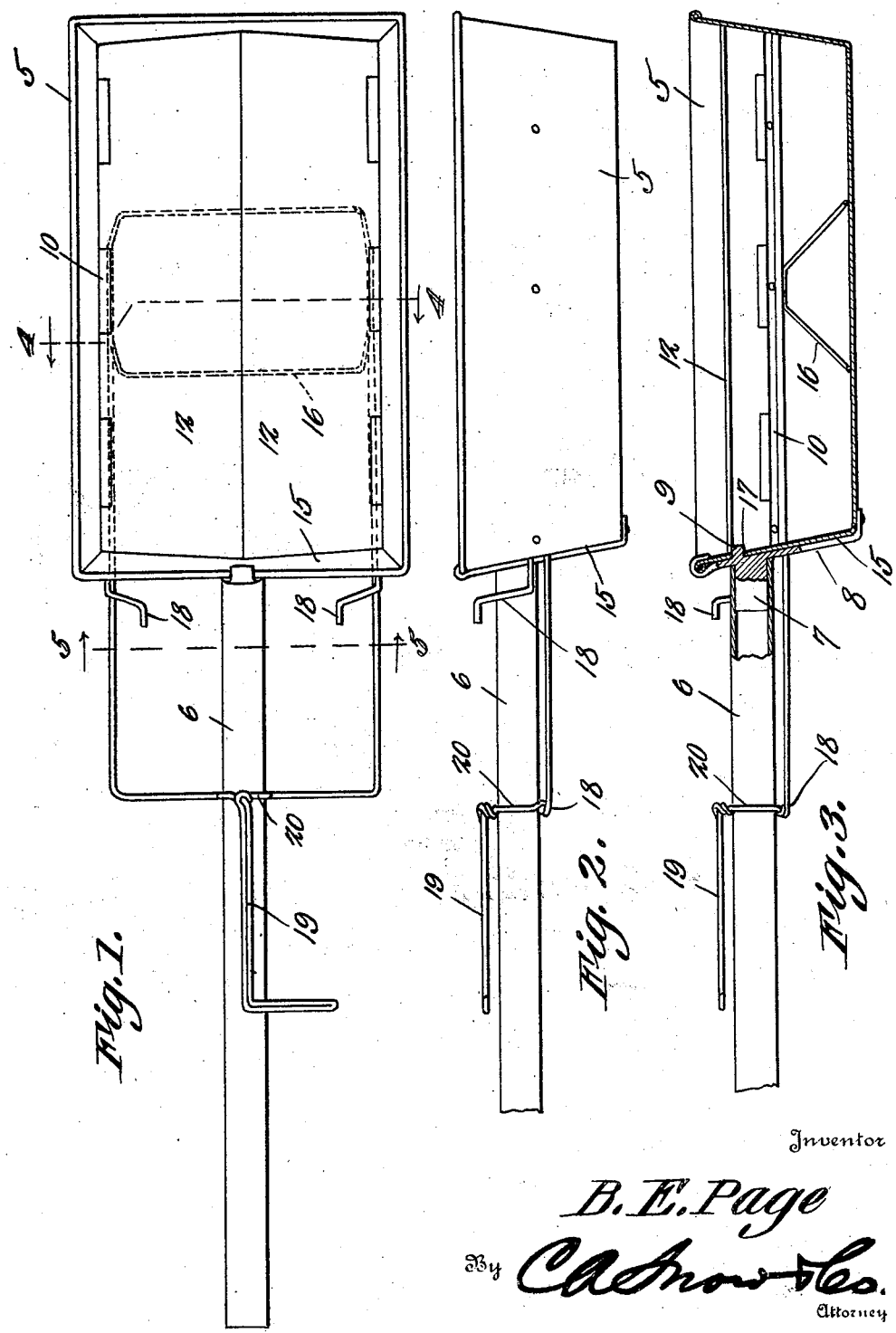
Inventor
B. E. Page
By C. A. Snow & Co.
Attorney Sept. 11, 1923.
B. E. PAGE
CORN POPPER
Filed April 14, 1922    2 Sheets-Sheet 2
1,467,448
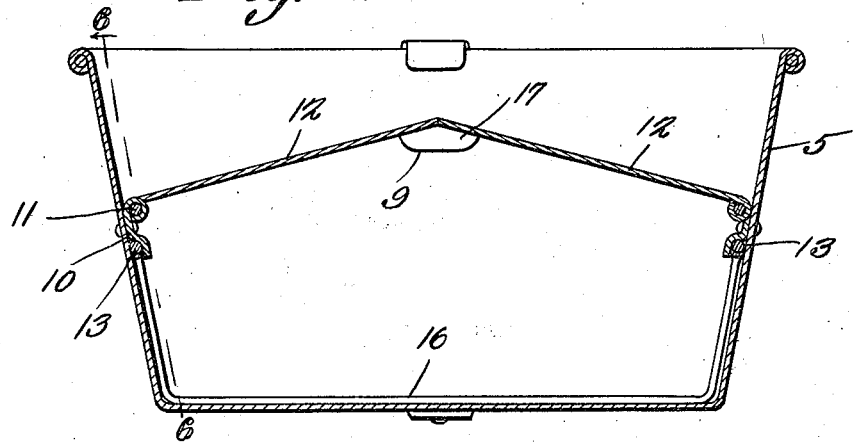
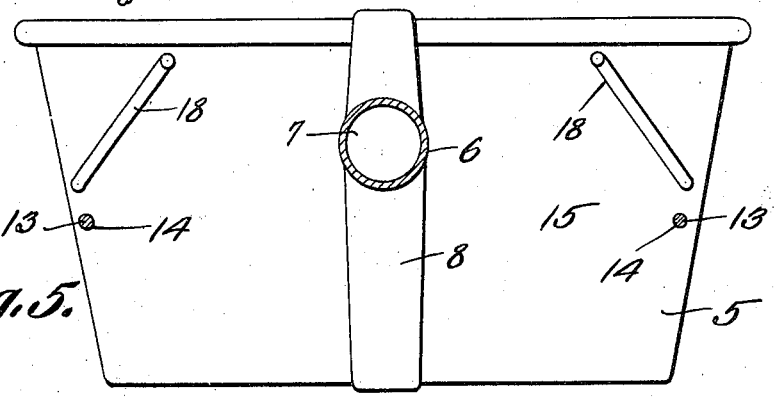
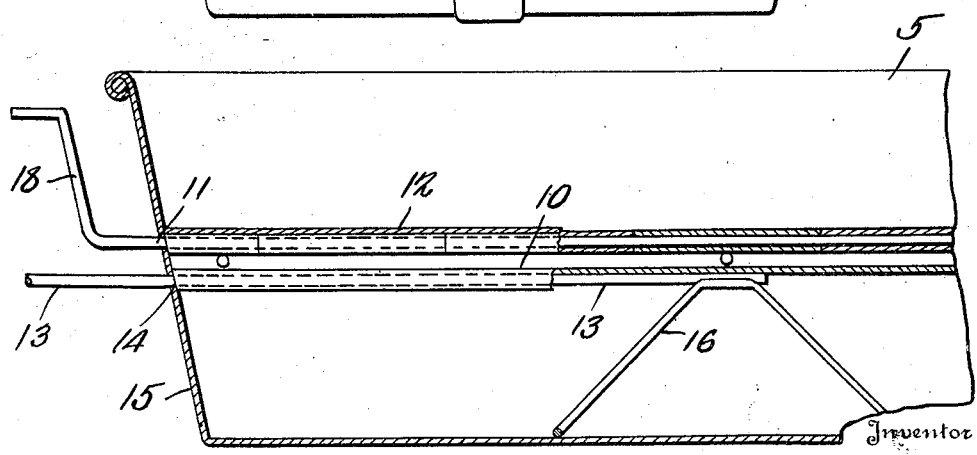

Patented Sept. 11, 1923.

1,467,448

UNITED STATES PATENT OFFICE.

BYRON E. PAGE, OF SPRING VALLEY, MINNESOTA.

CORN POPPER.

Application filed April 14, 1922. Serial No. 552,497.

*To all whom it may concern:*

Be it known that I, BYRON E. PAGE, a citizen of the United States, residing at Spring Valley, in the county of Fillmore and State of Minnesota, have invented a new and useful Corn Popper, of which the following is a specification.

This invention relates to domestic cooking vessels, and more particularly to a device especially designed for popping or cooking popcorn.

The primary object of the invention is to provide a vessel of this character wherein the corn may be popped in butter, to the end that the kernels receive an equal amount of the butter to flavor the same.

Another object of the invention is the provision of means to prevent the corn from scorching while the same is being popped or cooked.

Another object of the invention is to provide means to prevent the corn from passing from the vessel, during the popping operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a popcorn popping device constructed in accordance with the present invention.

Figure 2 is a side elevational view of the same.

Figure 3 is a longitudinal sectional view through the hand or corn containing vessel.

Figure 4 is a sectional view taken on line 4—4 of Figure 1.

Figure 5 is a sectional view taken on line 5—5 of Figure 1.

Figure 6 is an enlarged fragmental sectional view of the pan.

Referring to the drawings in detail, the reference character 5 designates the vessel or corn containing pan which is formed preferably of sheet metal. The handle portion is indicated at 6, the same being preferably tubular and has one end thereof disposed adjacent to one end of the pan 5 where the same receives the extension 7 of the securing bar 8, which secures the handle portion to the pan. This securing bar 8 is formed with an inwardly extended lug 9 positioned in an opening formed in one end of the pan 5 as clearly shown by Figure 3 of the drawings.

Secured to the inner surfaces of the side walls of the pan, are the hinge members 10 which are formed of strips of metal, the upper edges thereof being curved downwardly and inwardly as clearly shown by Figure 4 of the drawings to embrace the rods 11 carried by the movable plates 12.

The lower portions of the strips of metal are bent outwardly and downwardly to accommodate the rods 13 providing guards for the rods to insure movement of the rods longitudinally of the pan 5. The rods 13 extend through openings 14 formed in the end walls 15 of the pan.

Secured to the inner ends of the rods 13 is an agitating member 16 which is formed of a length of wire adapted to rest on the bottom wall of the pan and move thereover, to agitate the material contained in the pan to prevent the same from sticking or scorching under the heat of the fire during the popping operation.

The movable plates 12 contact with the stop 17 which is secured to one end wall of the pan as clearly shown by Figure 4 of the drawings, whereupon the plates 12 may be supported in their closed positions. Formed on the inner ends of the rods 13 are the operating handles 18, which provide means for operating the plates 12 to move the same to their opened or closed positions. The forward ends of the rods 13 are connected as at 18, where the same have connection with the operating handle 19 that is shown as formed with a circular portion 20 positioned over the handle 6.

Thus it will be seen that corn to be popped, may be positioned in the pan 5 and a suitable amount of butter added thereto.

As the corn begins to pop the handles 18 may be operated to move the plates 12 to their closed positions, eliminating any possibility of the corn passing outwardly from the pan during the popping operation. The handle portion 19 is now operated to move the agitating member 16 longitudinally of the pan to keep the corn moving within the pan, to eliminate any possibility of the corn scorching, and at the same time thoroughly mixing the corn with the butter.

Having thus described the invention, what is claimed as new is:

In a device of the character described, a pan, including a handle, a slidable agitating member comprising laterally spaced bars adapted to move over the supporting surface of the pan, spaced horizontal operating bars extending into the pan and secured to the agitating member and having right angled portions having their ends formed into loops to embrace a portion of a handle, and said right angled portions terminating in a handle for operating the agitating member.

In testimony that I claim the foregoing as my own, I have hereto affixed my signature in the presence of two witnesses.

BYRON E. PAGE.

Witnesses:
VIOLET KAVANAGH,
CLIFFORD J. BOWERS.